United States Patent [19]

Shearer

[11] Patent Number: 5,573,320
[45] Date of Patent: Nov. 12, 1996

[54] ENCLOSED SEAT FOR VIDEO GAME PLAY

[76] Inventor: Brian R. Shearer, P.O. Box 5060, Mills River, N.C. 28742

[21] Appl. No.: 404,453

[22] Filed: Mar. 15, 1995

[51] Int. Cl.⁶ .................................................. A47B 97/06
[52] U.S. Cl. ........................ 312/223.3; 312/223.1; 312/235.2; 312/235.9; 297/184.14; 297/217.5
[58] Field of Search ........................ 297/184.14, 217.5; 312/223.3, 223.1, 235.2, 235.9

[56] References Cited

U.S. PATENT DOCUMENTS

| | | | |
|---|---|---|---|
| 4,470,631 | 9/1984 | Powell | 297/217.5 X |
| 4,826,245 | 5/1989 | Entratter | 297/217 X |
| 4,960,117 | 10/1990 | Montcrief et al. | 273/148 X |
| 5,171,059 | 12/1992 | Patrick | 297/184 X |
| 5,275,482 | 1/1994 | Grant | 312/223.3 X |

Primary Examiner—Peter M. Cuomo
Assistant Examiner—Stephen Vu
Attorney, Agent, or Firm—Michael E. Smith

[57] ABSTRACT

An enclosed seat for video game play, consisting of a seat within two side walls, with an adjustable monitor support shelf designed to support an electronic game system or personal computer system with keyboard and/or joystick as well as the monitor. The enclosed seat is easily assembled from simple components.

2 Claims, 4 Drawing Sheets

ENCLOSED SEAT FOR VIDEO GAME PLAY

BACKGROUND OF THE INVENTION

1. Field of the Invention: The present invention relates to an enclosed seat or "cockpit" for video game play, with provision for supporting an electronic game machine or a personal computer, keyboard, joystick, monitor, and speakers in the proper relationship for easy game play.

2. Brief Description of the Prior Art. Electronic or video games, in which a computer processor is used in conjunction with one or more input devices and a display monitor, have become very popular. In commercial video arcades, many popular machines use an enclosed or semi-enclosed seat or cockpit to enhance the impression of reality. At the present time, home versions of these cockpits are feature-laden and therefore prohibitively expensive. The instant invention provides a comfortable and adaptable enclosure, without the additional expense associated with the more complex commercial-type enclosures.

A number of inventions have been developed to divide offices, businesses or other areas into smaller sections or cubicles. An example is U.S. Pat. No. 4,856,242 to Baloga, et al. These devices do not replicate the "cockpit" atmosphere desired for playing games such as flight simulators or combat games. Other devices have disclosed small, intimate enclosures for the purpose of providing privacy or protection from the elements, such as, e.g., U.S. Pat. No. 5,171,059 to Patrick. These are not equipped to receive and support the accoutrements of video or computer games.

Other inventions have been developed to enhance game playing by providing motion or sound enhancement. U.S. Pat. No. 3,628,829 to Hellig discloses a means to vibrate the chair in harmony with motion picture or television programs. U.S. Pat. No. 4,826,245 to Entratter discloses a viewing chair inside an ovate privacy chamber, but does not provide any means for containing the parts of a video game or computer system.

U.S. Pat. No. 5,195,746 to Boyd et al., discloses a chair incorporating video game control devices, which is free-standing and intended to be used with a commercial type self-contained video game. This method of enhancing the gaming environment does not provide the player with an enclosure separating the player from distracting external influences. In addition, this device includes game control devices with the chair, which is more costly and complex than the instant invention, which uses the video game or personal computer system without modification. U.S. Pat. No. 5,290,034 to Hineman is similar in that the chair is not enclosed and includes control devices.

SUMMARY OF THE INVENTION

I have developed a new and improved enclosure for a video game or computer system and the game player. The enclosure includes a seat, enclosed on four sides by a simple system of easily assembled, lightweight parts. The player when seated faces a monitor support shelf which can be moved to a comfortable distance from the player. The monitor support shelf is sized to accommodate a computer monitor or television set, and will also accommodate a keyboard and joystick. The game system or central processing unit may be placed on the monitor support shelf, or on the floor. An additional feature of the invention is a speaker support bracket, which also serves to support the seat bottom. This speaker support bracket has two cut-outs which will accommodate automotive type speakers, and the corners of the speaker support bracket are also cut to allow wires to pass through to the speakers from the computer or video game system. Optional doors may be provided to completely enclose the seat and game system.

The invention may be made of plywood, particle board, or of plastic, and the specific features, such as the optional doors and the supports for the seat and monitor support shelf will be adapted to the material used. The parts of the invention may be sized for shipping by economical means.

DETAILED DESCRIPTION OF THE INVENTION

Many variations and modifications of the embodiments of the invention will be apparent to those skilled in the art without departing from the scope of the invention, which is defined in the claims appended hereto.

Figure 1:
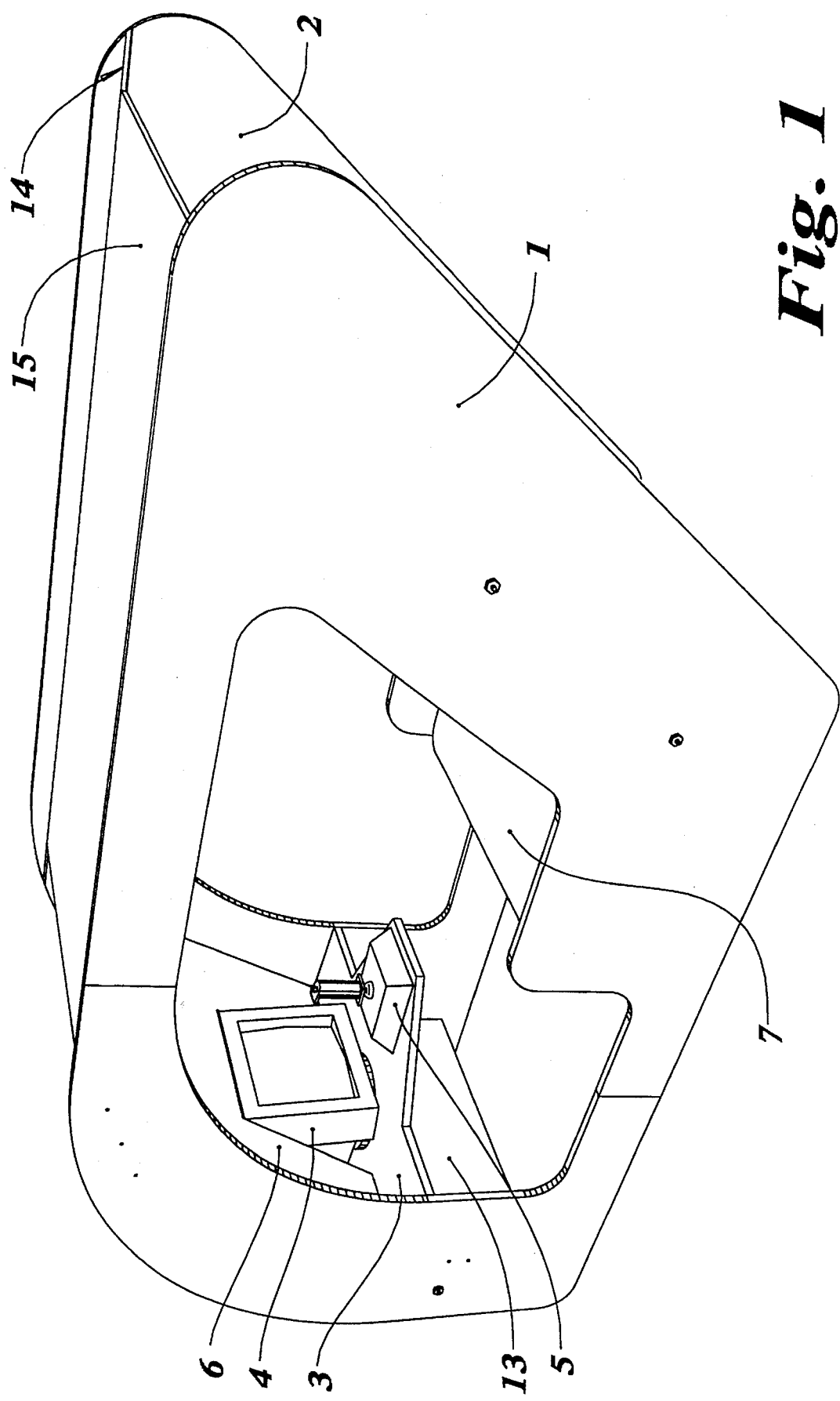
FIG. 1 is a pictorial representation of a preferred embodiment of the invention in side elevation, showing the component parts of the invention.

Referring now to the figures, which depict a preferred embodiment of the invention, FIG. 1 shows a side view of the invention from the left rear. All structural components of the -preferred embodiment of the invention are constructed from a rigid material, such as, for example but not in limitation, plywood or polystyrene. The invention consists of a left side member 1 and a right side member 2, each of which is provided with slots 14, into which other components are mounted. A seat bottom 7 is located between left side member 1 and right side member 2, and fits into and is supported by slots 14. A computer monitor 4 and other computer components, such as for example a keyboard or central processing unit, or an electronic game system, not shown, may be placed on the monitor support shelf 3. Slots 14 into which the monitor support shelf 3 is mounted are longer than the depth of monitor support shelf 3, allowing the monitor support shelf 3 to be moved toward or away from the seated operator. Monitor support shelf 3 is shaped to provide a central extension upon which the computer joystick 5 or another type of game operating device is placed. Monitor surround 6 is made of a formable material such as foam insulation board, and may be cut by the user to fit around the specific computer monitor 4 provided by the user. Vertical front side 13 is mounted under monitor support shelf 3 and provides additional support to left side member 1 and right side member 2. The seat invention is further enclosed by top member 15 and monitor surround 6, both of which are made of a lightweight material such as foam insulation board. Neither the top member 15 nor the monitor surround 6 are structural components of the preferred embodiment of the invention, and may be removed if desired.

Figure 2:
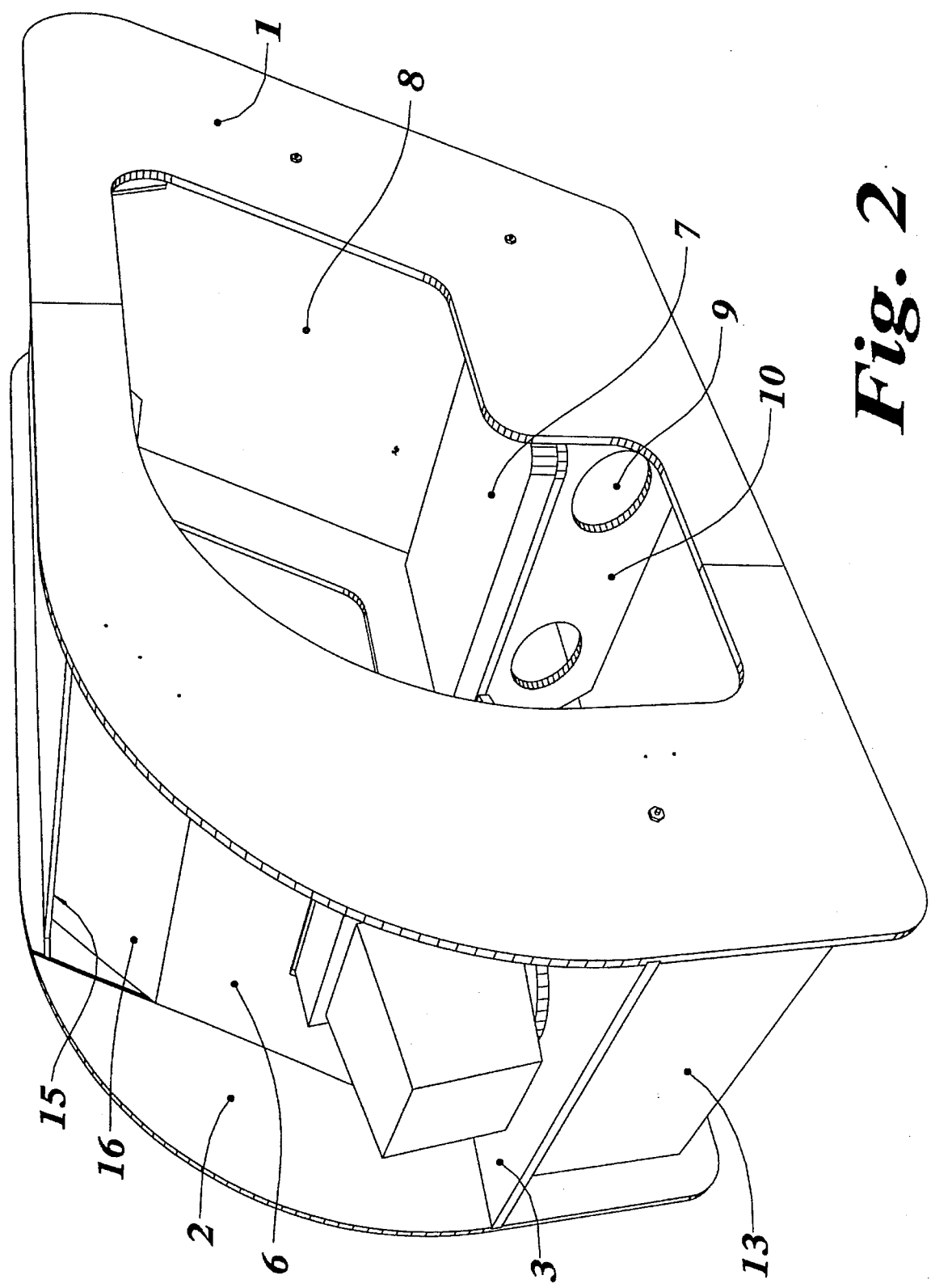
FIG. 2 is a pictorial representation of a preferred embodiment of the invasion from the front angle.

FIG. 2 is a second view of the invention, allowing a view of component parts. Seat back 8 is mounted in slots 14 at an angle to seat bottom 7. A speaker mount 10, with two speaker openings 9 sized to receive automobile type speakers, is mounted vertically underneath the front edge of seat bottom 7. Speaker mount 10 provides additional support to seat bottom 7, and each lower corner is cut off to allow passage of electrical and electronic wiring.

Figure 3:
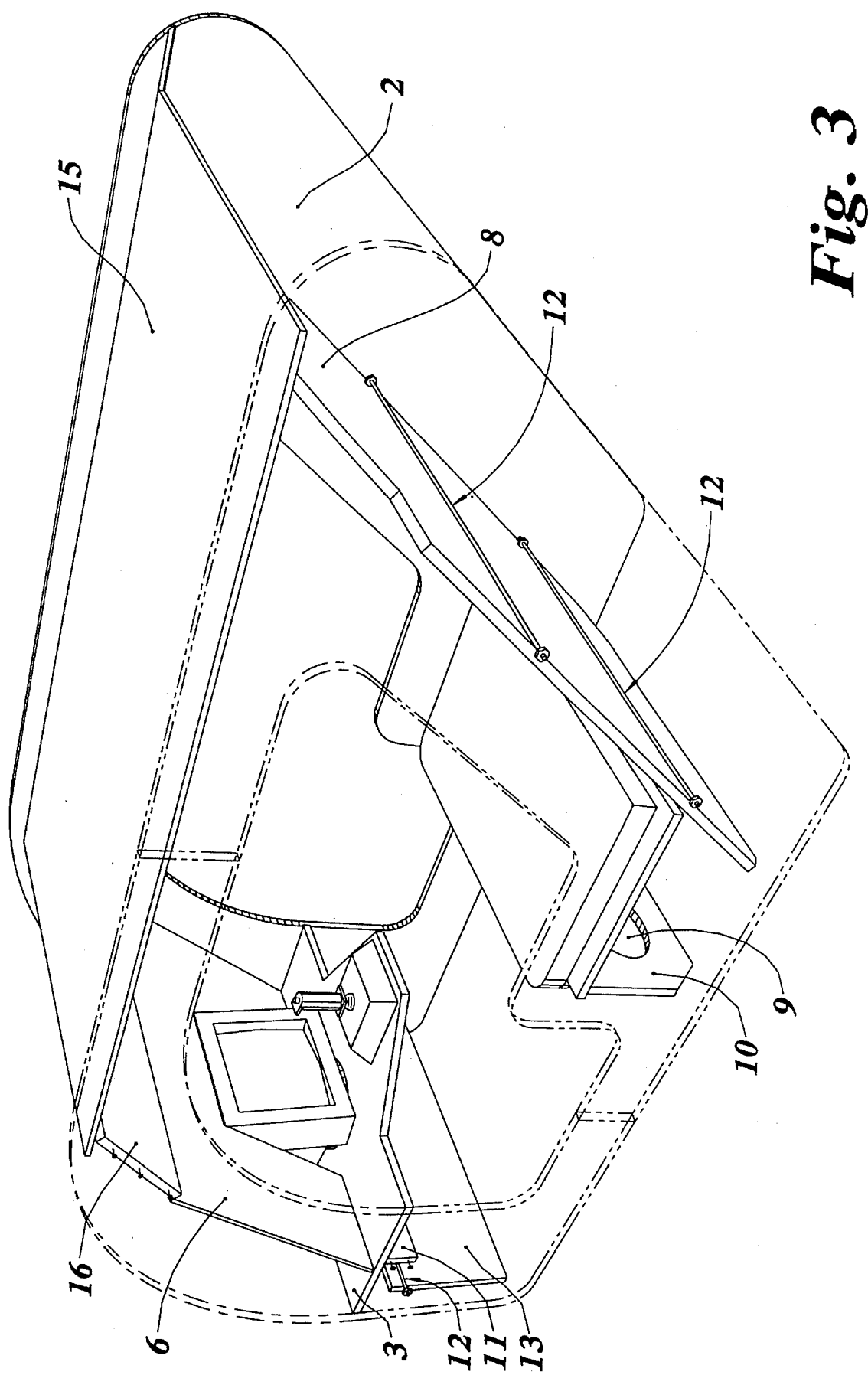
FIG. 3 is a cut-away view of the invention from the same location as FIG. 1.

FIG. 3 is a cut-away view of the invention of FIG. 1, showing the relationship of the component parts described above. A monitor support shelf brace 11 is mounted vertically between left side 1 and right side 2. Left side 1 and right side 2 are joined by three metal transverse bars 12. Two transverse bars 12 are located behind the seat back 8, and the third transverse bar 12 is located underneath the monitor support shelf 3. Said transverse bars 12 serve to hold the said left and right sides 1 and 2 of the invention in rigid relation to the sides and the other elements of the invention. Brow piece 16 is mounted at an angle above monitor support shelf 3 and between left side 1 and right side 2, and further encloses the seating space, while also providing additional support.

Figure 4:
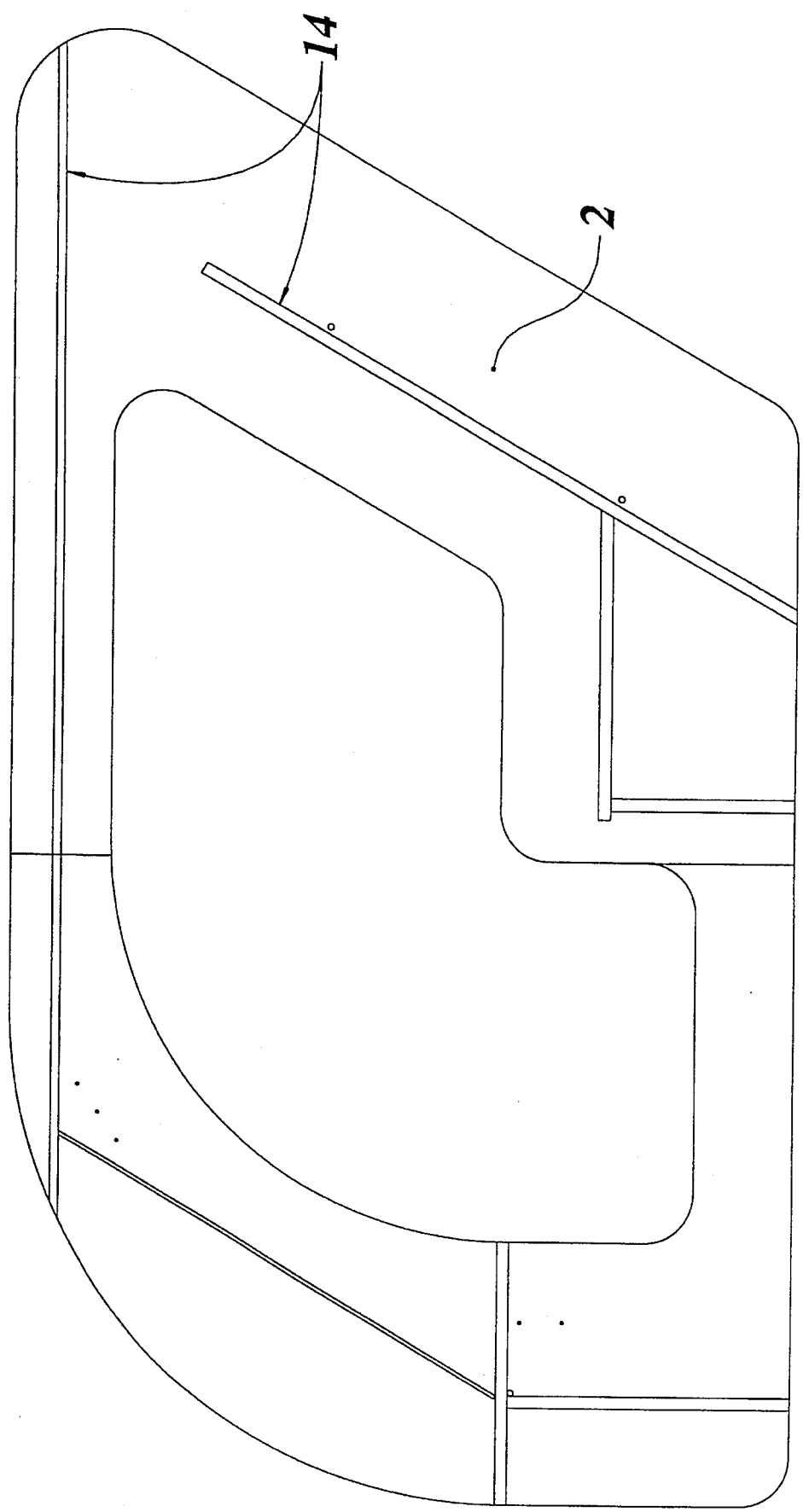
FIG. 4 is a plan view of the interior side of one side panel of the preferred embodiment of the invention.

FIG. 4 is a plan view of the right side member 2 of the invention, showing slots 14 into which the various component parts are inserted. Slots 14 may be supplanted by support protrusions, in, for example, an embodiment made of molded plastic.

The embodiments described above are merely descriptive of its principles and are not to limit the scope of the invention set out in the following claims.

What is claimed is:

1. A floor-standing seat enclosure, comprising a left side member and a right side member, each side member having integral support means therein, said integral support means of said side members directly supporting a monitor support shelf, a monitor support shelf brace, a vertical front piece, a brow piece, a seat bottom, a seat back, a speaker mount, a monitor surround and a top member, respectively, said side members being joined together by transverse braces which extend through and are removably fastened to said left side member and said right side member, said transverse braces being located behind the seat back and underneath the monitor support shelf and supporting said seat back and said monitor support shelf while maintaining said seat enclosure in a rigid relationship with respect to said integral support means, said monitor support shelf being slidingly supported within said integral support means which are of a length greater than the depth of said monitor support shelf, said monitor support shelf including a central extension of a trapezoidal shape.

2. The device of claim 1, in which said integral support means being slots provided within said side members.

\* \* \* \* \*